Patented Aug. 8, 1944

2,355,180

UNITED STATES PATENT OFFICE 2,355,180

PLASTIC COMPOUND AND METHOD OF MAKING SAME

Marc de Becker Remy, Detroit, Mich.

No Drawing. Application April 21, 1941,
Serial No. 389,621

1 Claim. (Cl. 106—123)

This invention relates to plastic compounds and particularly to a plastic compound in which lignin may constitute the principal ingredient, and is a continuation in part of my application for Letters Patent of the United States for improvements in Method of converting grain into useful products, filed April 12, 1940, and serially numbered 329,214.

Objects of the invention include the provision of a plastic compound consisting principally of lignin which is of improved ductility and plasticity as compared to lignin compounds heretofore produced; the provision of a plastic compound including lignin and a plasticizer capable of reacting with it to form a new material having definite qualities and capable of being worked in a suitable manner; the provision of a plastic compound comprising lignin and one or more additional elements of a class consisting of wheat gluten, Hevea or other latex, proteins and casein; the provision of a plastic compound having a lignin base that is economical to manufacture, readily molded under heat and pressure and readily worked by usual tools; the provision of a plastic compound as above described which has been treated with an aldehyde; and the provision of a plastic compound as above described including a phenol condensate.

Further objects of the invention comprise a method of forming a plastic compound having a lignin base; the provision of a method of forming a plastic compound consisting of lignin and one or more elements of a group consisting of wheat gluten, latex, proteins and casein and including the steps of forming the lignin and one or more of the additional elements as an alkaline solution, mixing the solutions together and then coagulating the mixed material in the solution to provide the desired compound; the provision of a method of forming a lignin base compound comprising lignin and one or more of a group comprising wheat gluten, latex, proteins and casein comprising dissolving the lignin and the one or more of the elements of the group separately in alkaline solutions, bringing the alkalinity of all of the solutions to approximately the same pH value, mixing the desired amounts of the selected solutions together, coagulating the material in the mixed solutions, drying the coagulated compound, reducing it to powdered or shredded form and then molding it to the desired form under heat and pressure; and the provision of a method of forming a compound comprising lignin and one or more elements of the class consisting of wheat gluten, latex, proteins and casein including the steps of treating the compound with an aldehyde, with an aldehyde and phenol, or by the addition of a synthetic resin prior to the molding operation.

The above being among the objects of the present invention, the same consists in certain novel compounds and step or steps in the operation of forming such compounds, to be hereinafter described and then claimed, having the above and other objects in view.

Lignin is the non-carbohydrate portion of woody plant tissue, its composition varies slightly in different plants or woods and its real structure is not known. It is obtained in more or less pure form by several well-known methods all based on a hydrolytic reaction on wood or other vegetal material. It is thought that lignin so obtained is pure but it is not definitely known if it is exactly the same product which is combined with cellulose and unformed starches in wood. It is well understood that lignin has specific qualities that have been used in lignin or lignin compounds, treated with resin, compressed under heat with or without re-agents and with or without cellulose included, in the production of various articles of commerce. Lignin may be molded by known processes with or without thermo-setting resins, but plastics made out of lignin are brittle and do not have sufficient elasticity to adapt them to a wide commercial use.

The present invention was developed as a result of an attempt to improve on the qualities of pure lignin by adding to it, in its own structure, what was lacking in it from the standpoint of being a commercially satisfactory plastic compound in forms heretofore produced. In other words it was desired to blend products of different physical properties and qualities with the lignin to obtain a compound consisting principally of lignin but having properties and qualities not found in straight lignin compounds so as to obtain a product that could be varied in its properties and qualities to meet different problems. The material should be capable of chemically blending with the lignin so that the result would be a compound rather than simply a mixture.

Experiments have shown that wheat gluten, Hevea or other latex, proteins and casein when properly worked and brought into reaction with lignin are capable of forming with it the new compound desired, having definite qualities and capable of being worked about the same way as the original lignin and the resulting compound reacts well with formaldehyde and phenol. These new compounds possess more ductility and plasticity than the lignin itself and their ductility and plasticity may be varied to greater or lesser extents by the amount of such material compounded with the lignin. One or more elements of this group consisting of wheat gluten, latex, proteins and casein may be used or compounded with the lignin to obtain the desired final compound. Thus a new compound is provided in accordance with the present invention consisting principally of lignin and one or more elements of a group consisting of gluten, latex, proteins and casein and these elements may be added from a trace up to desirable percentages. In other words in a lignin-gluten compound the lignin and gluten may be present in a ratio of 3 to 1, respectively; in the lignin-protein compound the ratio of lignin to protein may be as high as 4 to 1; in the lignin-casein compound the casein may be present from 5 to 50% and preferably around 30%; and in the lignin-latex compound each element may be present from a trace to substantially 100% although from a commercial standpoint it will usually be desirable from the standpoint of cost not to employ more than 5% to 10% of latex in the compound. Where more than one element of the group is compounded with the lignin then although the proportion of the elements may vary from approximately a trace to 100% in each case it is preferable, for instance, where gluten and proteins are employed together that the proteins be present in from two to four times the amount of the gluten and where latex and casein are employed together that the casein be present in amounts of three to five times that of latex. Where latex is combined with either gluten or protein these latter may be present in substantially the same proportion as the casein in the latex-casein additions.

In the broader aspects of the present invention the particular method of obtaining the lignin and the various elements in the class consisting of gluten, latex, proteins and casein is immaterial as is also the manner in which they are compounded to provide the desired final product. For instance, they may be reduced to dry powdered form and intimately mixed together and then molded under heat and pressure. However, inasmuch as all of these elements are capable of being dissolved in alkaline solutions it is preferable to make such solution of the elements selected for the particular compound to be produced, with such solutions preferably at approximately the same pH value, then thoroughly mix the two solutions together and then coagulate the compound therefrom. The same result may be obtained by mixing the desired amounts of the desired ingredients together and then dissolving them together in a suitable alkaline solution. This method will ordinarily not be employed for the reason that in obtaining at least part of the ingredients the process will involve dissolving of the same in a suitable alkaline solution prior to drying, and, therefore, as far as such ingredients are concerned the drying and re-dissolving steps would comprise an unjustified waste. As will be appreciated, however, by following out either of these two methods a thorough intermingling of the two elements will result and result in a true compound of the elements. Accordingly, the method of forming a separate alkaline solution of each of the ingredients or elements and then mixing the solutions together will be described herein as the preferred method of forming the compound under discussion.

Lignin may be obtained by any of the various methods of producing paper pulp such, for instance, as by the soda, sulphate or sulphite process, the resulting liquor containing a relatively high percentage of lignin which may be separated out therefrom by well known processes. The soda process is preferred and, accordingly, it will be described by way of illustration. According to this method, hard or soft wood is worked in two operations. It is first reduced to chips and treated with hot water under a pressure of approximately three atmospheres to dissolve all the soluble matter, pentosans, and other carbohydrates. Part of the resins in the wood will be dissolved at this time. This is not a usual step in the preparation of wood pulp but is recommended in the practice of the present invention. The wood is next heated under pressure in a solution of sodium hydroxide (0.1% to 0.5%) to dissolve the lignin alone. This operation produces a water soluble solution of sodium lignate which is preferably filtered or centrifugated to extract all impurities.

If dry lignin is desired the lignate solution may be precipitated by a suitable acid as, for instance, sulphuric or hydrochloric acid preferably containing no iron which would color the lignin. The lignin may also be precipitated from the solution by passing carbon dioxide through it and such carbon dioxide may be obtained from furnace gases when properly cooled and filtered. The final product appears to have a brighter color when precipitated by carbon dioxide. The lignin so precipitated is then filtered, preferably pressed to eliminate as much water as possible and then dried and ground or otherwise treated.

It is to be noted, however, that whether the lignin is obtained by the soda process described or by the sulphate or sulphite processes commonly used to produce wood pulp, from the standpoint of the present invention the wood chips are preferably first treated under heat and pressure with pure water to extract the soluble substances as first mentioned as a superior product appears to result from this practice. However, it is to be understood that where the compound is to be produced in accordance with the preferred practices of the present invention, that is by mixing alkaline solutions of the elements, after the lignin has been abstracted from the wood chips by the use of the sodium hydroxide solution and the solution has been filtered or otherwise purified, the solution is then ready for mixing with the remaining solution or solutions.

Wheat gluten represents from 10% to 18% of the wheat depending on its quality or origin. It is extracted by well known wet processes from the wheat or from the wheat flour. Gluten has two chief constituents, namely glutenin and gliadin. The glutenin is the distinctive protein of wheat and occurs only in the wheat proteins. Gliadin confers upon the gluten its capacity of cohering to elastic masses. Gluten has a very complicated structure, it is composed of amino-acids and its molecule has some similarity to the lignin molecule. Its composition is approximately 53% carbon, 7% hydrogen, 15% to 18% nitrogen and about 1% sulphur. In preparing gluten in accordance with the preferred method of the present invention it is dissolved in a solution of sodium hydroxide or potassium hydroxide and particularly sodium hydroxide (0.1% to 0.5%) where it is to be employed in conjunction with sodium lignate. Some ammonium hydroxide may be added to the solution depending upon the nature of the other solution with which it is to be mixed.

The pH value of the solution should be watched carefully. The quantity of gluten dissolved increases with concentration of the alkalinity of the solution up to a degree of alkalinity equivalent to a pH value of approximately 13. It follows the laws of chemistry and reacts in a chemical reaction like a crystalloid. If thought necessary or desirable to have a pure solution the sodium glutinate may be filtered or purified by a centrifugal separator.

Latex is the milky juice of certain plants in which the rubber is distributed as rubber particles or rubber spheres. Additionally latex contains a certain amount of protein. The proteins dissolved in the serum of the juice may be coagulated and coagulate at about the same pH value as does the latex. By the addition of alkalies latex may be kept liquid for a long time. Ammonium hydroxide, sodium hydroxide or sodium carbonate may be used as such alkali and the alkalinity of the latex must be kept high enough to prevent spontaneous coagulation if the latex is to be maintained in liquid form. It is to be noted that the rich serum precipitates at the same hydrogen ion concentration as latex. The latex particles are negatively charged, so that in compounding them with positively charged particles the latex coagulates. The coagulation of latex may be effected by acids or salts. Acetic acid, hydrochloric acid or nitric acid may be used and it is to be noted that the strong acids coagulate the latex completely. It is latex in liquid form in an alkaline condition that is employed in connection with the preferred method of the present invention.

The latex or rubber elements of the compound of the present invention may include a minor proportion of reclaimed rubber under certain conditions. This is particularly so where the various elements or ingredients are dried and ground and thoroughly mixed together and then molded under heat and pressure, particles of reclaimed rubber being capable of being intermixed with such mixture as will be readily appreciated. It may also be mixed with any of the compounds produced according to the preferred method of the present invention after they have been dried and ground. Where incorporated as a part of an alkaline solution miscible with the other solutions under consideration it may also be added in dissolved form. Accordingly, it will be understood that in the broader aspects of the present invention the term "latex" and "latex solutions" are intended to be interpreted broadly enough to include reclaimed rubber in solid form or in solution as the case may be.

The protein employed may be obtained from any suitable source and in any suitable manner but preferably in substantially pure form. As a matter of illustration it may be obtained by treating flour or meal made from soya beans, rice or Indian corn, and from which the oil has been abstracted, with a suitable alkaline solution such as 0.1% to 0.5% sodium hydroxide which will dissolve the protein content of the flour or meal and the resulting solution may then be filtered or centrifugated to purify the same. Protein which has been previously produced in a dry form may be conditioned for the preferred method of the present invention by simply dissolving it in an alkaline solution of the type above described.

The casein which is employed in accordance with the present invention may be obtained from any suitable source and by any suitable method. It may be obtained in substantially pure form on the open market. It is, of course, principally obtained from the dairy industry as a by-product and great quantities are available at low price. In preparing the casein for use in connection with the preferred method of carrying out the present invention it is simply dissolved in a suitable alkaline solution and which, for instance, as in the case of the elements or ingredients already described, may be a solution of 0.1% to 0.5% of sodium hydroxide. It may also be dissolved in an equivalent solution of sodium carbonate.

In accordance with the preferred method of carrying out the present invention all of the above mentioned ingredients or such of them as are to be employed in the production of a desired compound are thus each dissolved in a separate alkaline solution as above described or the equivalent thereof. Preferably these solutions are standard solutions, that is, each preferably contains a standard or predetermined concentration of the elements therein so as to facilitate the calculation of the required amount of each solution to produce a final product having the desired proportion of elements or ingredients therein. All of the solutions are also brought to substantially the same pH value so that admixture of one solution with another will not disturb the equilibrium of the resulting mixed solutions. All of the solutions are also preferably brought to substantially the same temperature before being mixed together, such temperature preferably being approximately 30° C. and preferably not being over 50° C. As previously mentioned this mixture of solutions will in any case include a lignin solution together with one or more solutions of latex, wheat gluten, proteins or casein. The selected solutions may be mixed together in a suitable tank or container by means of stirring or the like, or they may be passed together through a homogenizator, colloidal mill or the like to effect an intimate admixture thereof. Where more than two ingredients are to be employed in a compound then the solutions of two or more of them may be mixed together and then mixed with the solution of the remaining compound or compounds, if desired. As previously mentioned the same result may be obtained by adding the dry ingredients to a suitable alkaline solution and causing the various ingredients or elements to be dissolved singly or in combination therein, but with the exception of casein this method will ordinarily not be employed for the reasons previously stated. The solutions thus having been mixed together or the solution of the desired materials having been otherwise produced, precipitation or coagulation of the lignin and the other material or materials is affected by the addition of suitable acids to the solution. Such acid is preferably added relatively slowly and care should be exercised by watching the pH value of the solution to prevent an excess acidity. Preferably only slightly more acid is added than is required to insure complete coagulation or precipitation of the compound. Any suitable acid may be used for this purpose such as sulphuric acid, hydrochloric acid, nitric acid, phosphoric acid, acetic acid or the like but such acid is preferably free of iron so as to avoid staining the compound. The acid may be added and thoroughly mixed with the solution or it may be added continuously while the solution is passing through the colloidal mill where such mill is employed for obtaining a homogeneous solution. The lignin and the other particles of the compound which are thus precipitated or coagulated fuse together and form a homogeneous mass. This new compound may be hardened by the action of aldehydes, as, for instance, formaldehyde. If thus hardened the pH value can thus be maintained relatively low, for instance approximately at a value of 4.7, before the reaction is started. If both an aldehyde and a phenol are added the resultant phenol condensate fuses with the compound and a still different compound results which has properties that are of a superior nature for certain uses, and is highly resistant to water. The aldehyde in such case hardens the compound as will be appreciated.

The compound thus precipitated or coagulated is thermoplastic. If not treated with an aldehyde to harden it it may be washed to reduce the acid content or eventually neutralized. The coagulate is then filtered, dried, in a vacuum if necessary and preferably at a temperature not in excess of 50° C., and then ground or shredded to reduce it to a mass of relatively small sized particles. The compound may be worked pure or with the addition of artificial resin such, for instance, as phenol-formaldehyde or other like resins.

The compounds resulting as above described are new compounds having specific qualities of their own. They can be molded under heat and pressure to any desired shape. Particularly where the compound contains latex or rubber sulphur may be added to enhance the vulcanizing effect on the compound and any of the usual rubber accelerators may also be employed under such conditions.

It will also be appreciated that suitable or desirable amounts of inert filler material may be mixed with the compound prior to molding and likewise coloring pigments or dye material may be added to impart the desired color to the final product. The final product may be worked with conventional tools employed to work material of substantially the same degree of hardness and/or elasticity. In this last connection it will be appreciated that the characteristics of the compound in this respect will vary according to the proportion of the element or elements added to the lignin in accordance with the practices of the present invention.

The compound may also be used as a binding material for wood chips and wood dust, sawdust and the like for the manufacture of boards of any thickness and size which can be manufactured continuously like paper board. In such case relatively thin boards or sheets may be superposed one on the other, and then suitably bound together by interposed coatings of the same or other plastics or adhesives, under heat and pressure where required, in substantially the same way ply-wood is produced. In such case metal reinforcements, which may take the form of wire netting or screen if desired, may be interposed between two or more of the layers and will be imbedded in the surfaces thereof during the pressing operation. This will, of course, result in a much stronger product.

On the other hand the compound may be formed in threads or fibers. This is accomplished by ejecting the mixture of the desired solutions through spinnerets under pressure or gravity into a solution of any of the acids above mentioned for the purpose of effecting coagulation of the solution. In such case the coagulation is preferably effected slowly and progressively and the solution after being coagulated into threads is drawn through a bath containing an aldehyde such as formaldehyde to harden the same. The formaldehyde also renders the threads insoluble. The threads or fibers thus formed may be employed for making fabrics or for any other of the usual purposes to which threads formed from natural fibers are employed.

It is to be understood that the resulting compound may consist of lignin and one or more elements of the group consisting of gluten, latex, protein and casein with or without the addition of a phenol condensate according to the desires of the manufacturer.

Having thus described my invention what I claim by Letters Patent is:

In the manufacture of a thermoplastic compound, the steps of forming an alkaline solution of lignin, separately forming an alkaline solution of wheat gluten of approximately the same temperature and pH value as said solution of lignin, mixing said solutions together, and then effecting simultaneous coagulation of said lignin and gluten in said mixed solutions by the addition of an acid to said solution.

MARC DE BECKER REMY.